Figure 1:
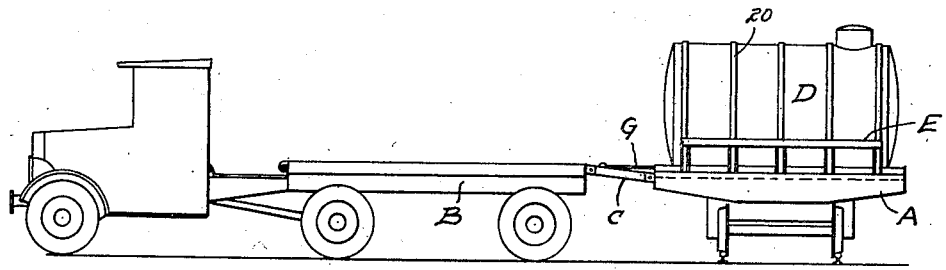

July 18, 1939.     B. F. FITCH     2,166,134

DEMOUNTABLE TANK FOR VEHICLES

Filed Sept. 9, 1935     3 Sheets-Sheet 1

INVENTOR.

BY Benjamin F. Fitch,

ATTORNEYS.

July 18, 1939. B. F. FITCH 2,166,134
DEMOUNTABLE TANK FOR VEHICLES
Filed Sept. 9, 1935  3 Sheets-Sheet 2
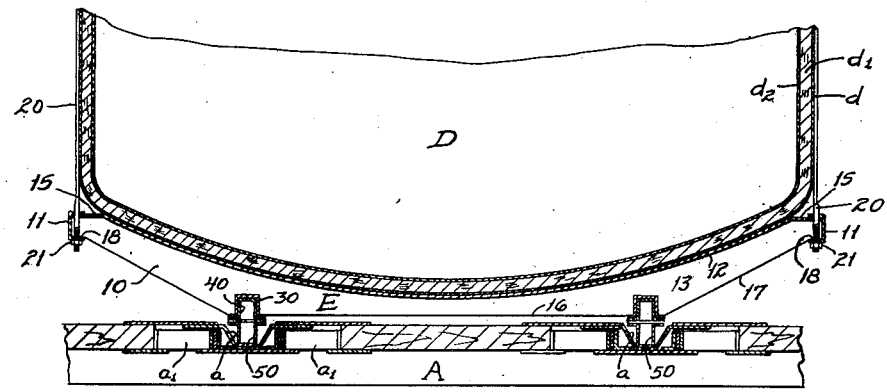
FIG. 4
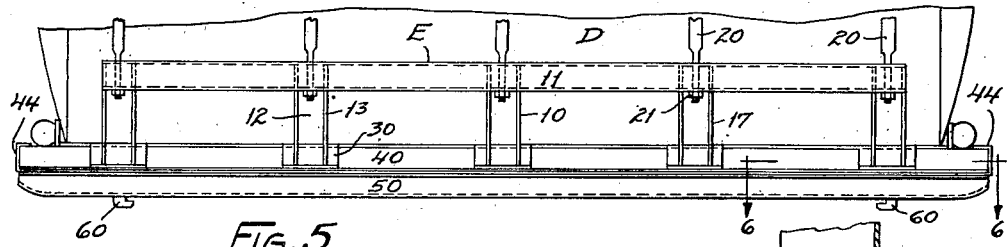
FIG. 5
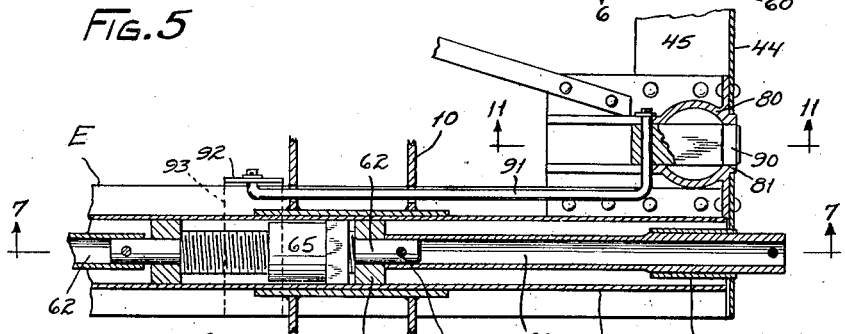
FIG. 6
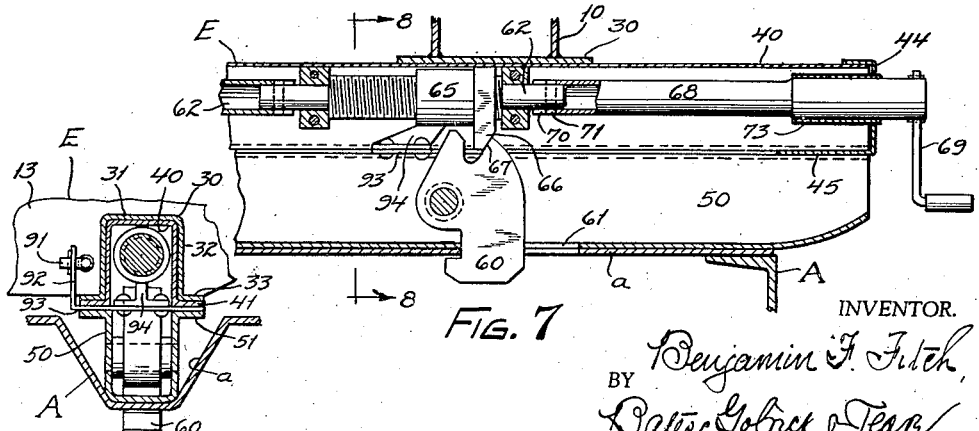
FIG. 7
FIG. 8
INVENTOR.
Benjamin F. Fitch,
BY
Bates, Goldrick & Teare
ATTORNEYS.

July 18, 1939.  B. F. FITCH  2,166,134
DEMOUNTABLE TANK FOR VEHICLES
Filed Sept. 9, 1935  3 Sheets-Sheet 3

INVENTOR.
Benjamin F. Fitch
BY
Bates, Gobrick & Hearn
ATTORNEYS.

Patented July 18, 1939

2,166,134

UNITED STATES PATENT OFFICE 2,166,134

DEMOUNTABLE TANK FOR VEHICLES

Benjamin F. Fitch, Greenwich, Conn., assignor to Motor Terminals, Inc., Cleveland, Ohio, a corporation of Ohio Application September 9, 1935, Serial No. 39,726

5 Claims. (Cl. 220—66)

This invention relates to a demountable tank for vehicles, and especially to a tank which may be slid from one vehicle and another, such as from a highway truck to a railway vehicle, or between a vehicle and a shipper's platform, or vice versa.

In my prior patent application, Serial No. 755,752, filed December 3, 1934, I disclose a system of transporting freight, wherein the freight is stored in demountable containers or bodies and the latter slid substantially horizontally from a highway truck and to a railway car, and transported by the railway car to a distant point. Then the body is slid from the car to a motor vehicle, which carries the body to a shipper's platform, whereupon the container is slid from the vehicle to the platform to permit the truck to be used for other purposes during unloading or loading of the body.

In the prior application mentioned, I also disclose one form of power mechanism carried by the truck for transferring or sliding the container onto and off of the truck, together with a series of aligned guideways on the vehicles which cooperate with supporting members or rails secured to the bottom of the container to facilitate the sliding of the container from one supporting surface to another.

In extending and expanding such a system, I have found that it is desirable to transport materials such as liquid (milk and the like) in comparatively large tanks, each tank comprising in effect a container or body unit. Certain difficulties, however, are encountered in the transportation of these liquid commodities, which are not encountered in the transportation of package and similar freight. For instance, the tank must be so constructed as to be devoid of sharp corners, which would prevent proper cleansing or sterilization of the tank. This is especially true if liquid is to be transported, such as milk. Further, there is a tendency, during transportation of the tank, for the liquid therein to surge, thereby presenting unequalized live load distributions on the body or tank frame during the transportation of the tank on the vehicle. In the case of a tank to contain milk, for example, it is also important that the tank be handled in such a manner as will not crack off even minute particles from the interior surface, which might contaminate the contents.

The general object of the present invention, therefore, is to provide a tank for liquid containers which will be efficient for the purpose intended and will overcome the difficulties above pointed out, but which may be used interchangeably with a package freight container now being utilized in my system on existing highway and railway equipment.

Another object of the present invention is to provide a tank or liquid container which may be economically manufactured and which will be of light weight so as to eliminate excessive tariff on the container itself, but which, at the same time, will be strong and durable, to the end that it may withstand the shock and rough usage to which it is put during its transportation on highway and railway vehicles, and during the movement of the container from one supporting surface to another, as, for instance, from a highway truck to a railway car.

Other objects of the present invention will become more apparent from the following specification, reference being had to the accompanying drawings, which illustrate a preferred embodiment of the invention, the essential novel features of the invention will be set forth in the claims.

Figure 2:
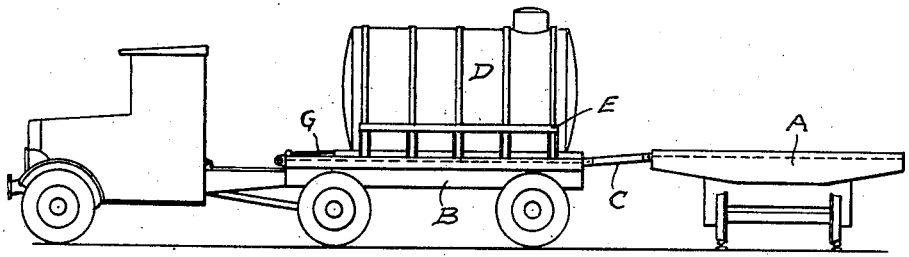
Figure 3:
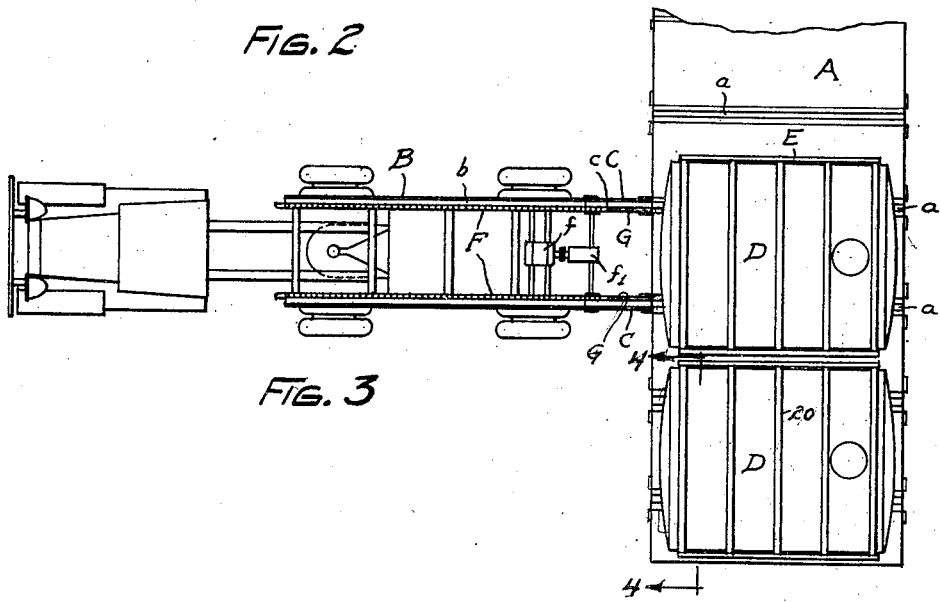
Figure 9:
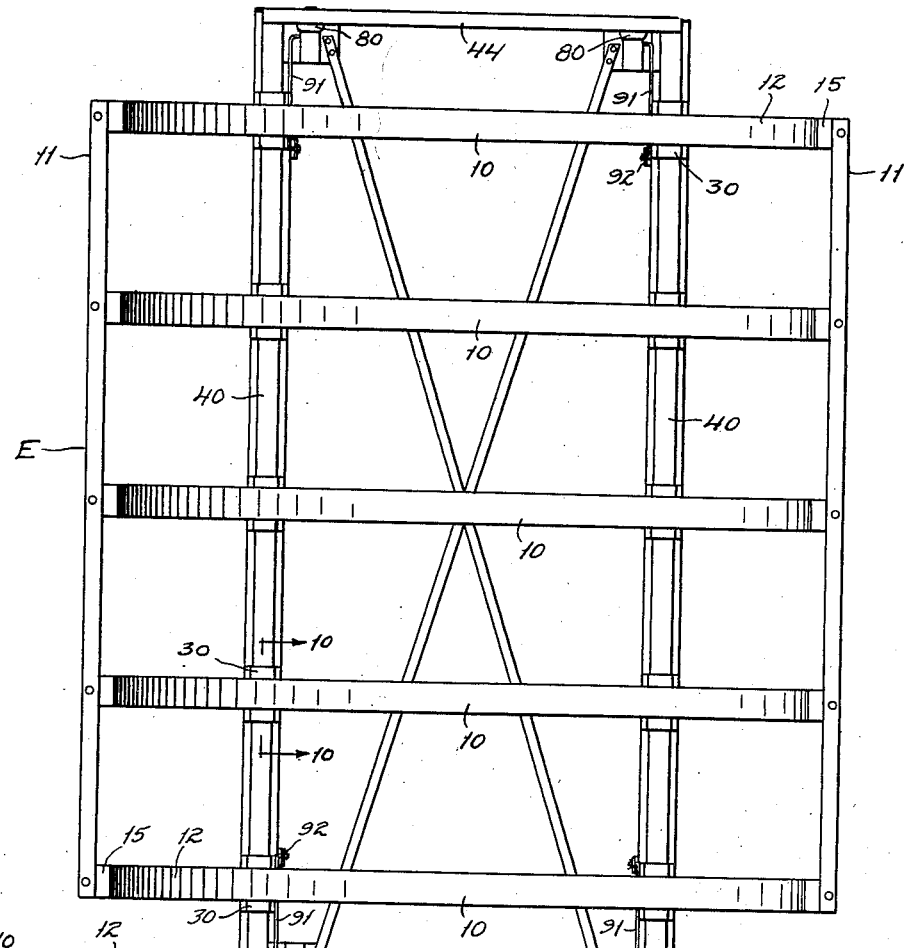
Figure 10:
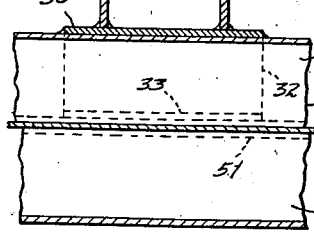
Figure 11:
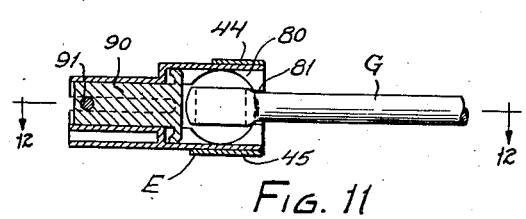
Figure 12:
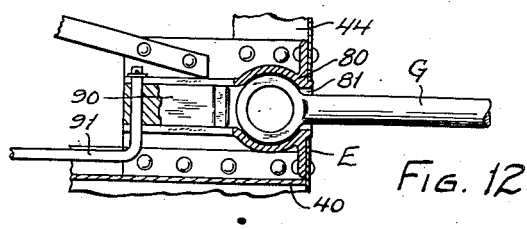

In the drawings, Fig. 1 illustrates a side elevation of my demountable tank, positioned on a truck railway car, ready for transferring to a truck standing adjacent thereto; Fig. 2 illustrates the container having been transferred from the car into position on the truck; Fig. 3 is a plan view of a truck and railway car, positioned for the transfer of a container from the railway car to the truck; Fig. 4 is a fragmentary sectional view on an enlarged scale, the plane of the section being indicated by the lines 4—4 on Fig. 3; Fig. 5 is an enlarged fragmentary side elevation of the body, the scale being substantially the same as that of Fig. 5; Fig. 6 is a sectional detail, the plane of the section being indicated by the lines 6—6 on Fig. 5; Fig. 7 is a fragmentary vertical section, as indicated by the lines 7—7 on Fig. 6; Fig. 8 is a transverse section, as indicated by the lines 8—8 on Fig. 7; Fig. 9 is a plan of the cradle without the tank; Fig. 10 is a sectional detail thereof, indicated by the line 10—10 on Fig. 9; Fig. 11 is a detail of the anchorage of the push-and-pull bar to the cradle, being a vertical section in the plane indicated by the line 11—11 on Fig. 6; Fig. 12 is a detail of the same in section in the plane indicated by the line 12—12 on Fig. 11.

Briefly, as shown in Figs. 1 to 3, inclusive, A indicates a railway car, B a highway truck, C bridges pivotally carried by the truck at its rear end and adapted to be attached to the side of the car, D a tank for the liquid, and E a cradle supporting the tank and having at its bottom supporting rails to adapt it to slide in ways on the highway truck, bridges or car. Such ways comprise upwardly facing channels b, c, a on the truck, bridges and car respectively. Suitable mechanism on the truck is adapted to propel the cradle and tank along the ways in either direction. This mechanism may, for instance, comprise longitudinal sprocket chains F on the truck and bridges driven by a suitable electric motor f on a truck connected by reduction gearing indicated at f—l, shafts and sprocket wheels with the chains. Suitable push-and-pull bars G, temporarily attached to the chains and cradle, enable the motor to shift the cradle and tank.

The upwardly facing guiding channels a on the car (of which there are preferably several pairs) have flaring side walls, as shown in Fig. 4, and may be in the form of plates which have flanges slidable beneath fixed plates on the car floor, and there may be interposed resilient blocks or springs a1 between the side walls of the channels and the car floor to provide a shock absorber between the cradle and car, thus materially reducing the effect on the cradle and tank of sudden jars in starting and stopping of the train.

Referring now to Figs. 1 to 5, inclusive, the tank D is shown as a horizontal body of approximately elliptical form in vertical cross section but with side portions vertical and the usual outwardly bowed ends. This body may have an outer metal shell d, an insulating lining d1 and an inner facing d2, which is sometimes of vitreous material and sometimes of stainless steel.

The tank rests on a set of bolsters 10 which are connected together by longitudinal beams 11, which parts, together with the other features to be mentioned, constitute the cradle E, heretofore mentioned. The bolsters 10 are of inverted channel shape, having a top web 12 and vertical flanges 13. The upper face of the bolsters for the most part is in the same arc as the underface of the tank, but near the ends the top web 12 extends horizontally, as shown at 15. The vertical flanges in the intermediate region terminate horizontally at the bottom, as at 16, and then near the extreme portions is inclined upwardly as at 17, except that the extreme end where the bottom edge extends outwardly horizontally as indicated at 18. The side members 11 are inwardly facing channels with their webs vertical and their flanges horizontal and the two flanges extend snugly over the extreme portion 15 of the top web of the bolsters and the extreme portion 18 of the flanges, and are effectively secured to such parts, preferably by welding. This makes a comparatively light and at the same time rigid cradle on which the tank may rest.

The tank is firmly secured on the cradle on which it rests by a series of metal straps 20, which extend in U-shape over the top of the tank and down the sides and pass through the flanges of the side members 11 and the bolsters. These straps at their lower ends are threaded and carry nuts 21 by which the straps are drawn tightly onto the tank.

To provide for supporting the cradle in a manner enabling it to be slid, as heretofore mentioned, without materially raising the center of gravity of the tank or weakening the effective strength of the cradle, I notch the webs of each bolster adjacent their deepest portions, that is, in the region where the inclined bottom edge joins the horizontal bottom edge, and insert in such notches downwardly facing U-shaped plates 30, each of which is welded to the corresponding bolster. These channel shaped plates 30, as indicated for instance in Fig. 8, have horizontal webs 31, vertical side flanges 32, which at their lower ends terminate in outwardly extending horizontal edge flanges 33. Mounted in the downwardly facing notches provided by these channel-shaped plates 30 is a pair of long channel beams 40, extending the length of the cradle and formed in cross-section similarly to the plates 30 but sufficiently narrower so that it may snugly nest within the various plates 30, as indicated in Fig. 8. These downwardly facing channels 40 are secured effectively to the members 30, as for instance by welding. At each end the beams are braced by a channel-shaped horizontal cross beam 44, the flanges of which overlap the tops and bottoms of the beams 40 and are secured to them.

Directly below the downwardly facing channel beams 40 are corresponding upwardly facing channel beams 50. The vertical side flanges of these beams 50 lie directly beneath the side flanges of the beams 40. At their upper ends the beams 50 are flanged outwardly horizontally at 51 directly beneath the flanges 41 of the beams 40. While the flanges 41 and 51 are secured together, I prefer to effect such securing only adjacent the ends by rivets which pass through suitable distance plates between the flanges 41 and 51. Thus, near the extreme ends of the channels I may employ the lower flange 45 of the end beams 44 as the distance plates, this flange being quite wide. By connecting the channels 40 and 50 only near their ends or at intervals, I allow for a slight distortion or flexing of the channels 40, without disturbing the true condition of the channels 50. If desired, however, the flanges 41 and 51 could engage each other and be riveted directly together throughout their length.

The hollow downwardly facing channel 40 and the hollow upwardly facing channel 50 together provide a light and at the same time very effective support for the other members of the cradle and hence for the tank. These hollow channels also provide housings for mechanism to lock the cradle to the car or truck. I may employ for this purpose locking mechanism similar to that shown, described and claimed in my prior application 755,752, heretofore mentioned. Combined with the locking mechanism is means for preventing injury to the parts by the application of moving power when the cradle is locked. This mechanism may be similar to that shown, described and claimed in my copending application 32,130, filed July 18th, 1935. These mechanisms are illustrated herein, particularly in Figs. 6, 7, 8, 11 and 12, and will now be described.

The locking of the body to the truck or car is effected by hooks 60 pivotally mounted in horizontal axes within the channel beams 50 and extending downwardly through openings 61 in the bottom webs of such beams. One of these hooks is shown in Fig. 7 and there is a corresponding hook facing the opposite direction similarly located adjacent the other end of the cradle, as shown in Fig. 5. Hence, these hooks, when in the position shown in Figs. 7 and effectively lock the cradle and tank to the vehicle.

To operate the hooks 60 simultaneously I provide within the cradle channels 40, a rotatable shaft 62 mounted in suitable bearings as 63.

This shaft is shown in Fig. 7 with a right-hand screw thread for operating the hook 60 and is likewise provided near the other end of the cradle with a left-hand screw thread for operating the other hook, not shown in that figure. Suitable nuts 65, of which one is shown in Fig. 7, engage the respective threads. Each nut has a downwardly projecting lug 66 which extends into a notch 67 carried by the corresponding hook 60.

It will be seen that the rotation of the shaft 62 will serve to rock the two hooks oppositely on their pivots so that they may be swung to engage keepers in the truck or car channels or by the opposite movement to be freed therefrom. I may readily rotate the shaft 62 by the insertion in alignment therewith of the tubular shank 68 of a removable crank 69, this crank having a notched end 70 adapted to straddle a pin 71 on the shaft 62. A suitable sleeve 73 carried by the web of the end beam 44 of the channel beam 40 may form an effective guide for the crank shank.

The means heretofore referred to for preventing the inadvertent application of moving force to the cradle when it is locked is illustrated in Figs. 6, 11 and 12, and comprises a socket 80 secured to the end beam 44, which forms the caps for the beams 40, such socket being adapted to receive the end of the push-and-pull bar, or a block for preventing admission to the socket when the cradle is locked to the vehicle, as about to be described.

The socket 80 has a substantially spherical cavity but the entrance thereto is substantially rectangular. The push-and-pull bar G has a flattened round head, which is adapted to be inserted through the rectangular opening and thereafter lock the socket by giving the bar a quarter axial turn. To prevent such admission of the push-and-pull bar when the cradle is locked, I provide a block 90 slidable horizontally across the socket 80 and connected by a rod 91 to a bracket 92 attached to the corresponding nut 65. These parts are so arranged that as the nut travels in swinging the hook into locking position this same movement automatically causes the rod 91 to move outwardly so that the block 90 comes into the opening 81 of the socket and closes it at the same time that the hook on the cradle engages the keeper on the vehicle.

The guide for the block 90 may readily be a portion of a casting which also forms the socket 80. To connect the rod 91 with the nut 65 it is very convenient to make the bracket 92 in the form of an angle plate, the vertical flange of which is pivotally connected with the rod 91, while the horizontal flange 93 extends slidably between the flanges 41 and 51 of the channels and in its mid-region has secured to it an extension 94 of the nut.

The simple mechanism described prevents the attachment of the push-and-pull bar whenever the cradle with its tank is locked in place and accordingly there can be no straining of the parts by applying moving power to the cradle when it is locked. The same mechanism also prevents setting of the lock when the push-and-pull bar is in place. The end of the block 90 being readily visible at the side of the container when the container is locked form a very convenient indicator or tell-tale to inform the attendant of the locked condition.

The leverage applied by the nut and screw units to the locking hooks suffices for manual centering of body if perchance it is not accurately located in locking position by conveyor chains. Such leverage makes possible the locking of body securely to either car, trailer or truck, thereby preventing, particularly on car, any lateral movement of body when the car, say is going around short radius curvatures, which setup lateral movement which might tend to develop a force for lock snubbing, if the locks were not entirely engaged. On the other hand, when locks are fully engaged no movement between friction surface of body skid rail and car anchorage rail is possible, by reason of the perfect alignment thereof and, resultingly, the tight engagement of locks.

It will be seen from the description given that by this invention I have provided a very simple, light and strong cradle which may effectively carry a tank and allow the same to be slid by the application of suitable mechanism to or from the vehicle. The construction adds little weight to the weight of the tank itself. It is so arranged that it does not raise the center of gravity of the tank materially above what it would have if tank bolsters rested directly on the car floor. At the same time it provides for the efficient sliding of the tank to or from the vehicle and for its effective locking to the vehicle.

I claim:

1. The combination with a tank of a cradle supporting the same comprising transverse bolsters of inverted channel shape, longitudinal side beams of channel shape with the webs vertical and the flanges horizontal, said flanges extending over the extreme portions of the bolsters and secured thereto, straps extending over the top of the tank and depending through the flanges of the side channels, and means for drawing the straps taut over the tank.

2. The combination with a tank of bolsters beneath the same, extending transversely of the tank and supporting it, said bolsters having downwardly opening notches therein, downwardly facing longitudinal channel beams occupying the notches of successive bolsters, upwardly facing channel beams beneath the downwardly facing channel beams secured thereto to form skid rails for the bolsters and tank.

3. A cradle for supporting a tank comprising parallel bolsters of inverted channel shape, said bolsters having their webs formed to engage the tank and their flanges terminating intermediately in a horizontal bottom plane and near the ends in upwardly inclined planes, downwardly facing notches formed in the flanges adjacent the junction of the horizontal and inclined planes respectively, hollow supporting beams set into said notches and secured to the bolsters, and side beams in the form of inwardly facing channels with their flanges extending across the top of the web and the lower edge of the flanges respectively.

4. A tank and supporting cradle structure, comprising parallel bolsters of inverted channel shape, said bolsters having their webs formed to engage the tank and flanges terminating intermediately in a horizontal plane and near the ends in an upwardly inclined plane, said tank extending across the bolsters and resting thereon, the webs of the bolsters and the bottom edges of the flanges being substantially horizontal at the extreme ends of the bolsters, and side beams in the form of inwardly facing channels with their flanges extending across the top of the web and the lower edges of the flanges respectively.

5. The combination of a tank, bolsters extending cross-wise of the tank on its under side and supporting the tank, said bolsters having downwardly facing notches therein, longiudinal beams occupying the notches and having lateral flanges at their lower edges, skid rails in the form of channel beams facing upwardly with flanges at their tops the flanges of the skid rails being directly beneath and secured to the flanges of the longitudinal beams.

BENJAMIN F. FITCH.